United States Patent [19]

Cooper

[11] 4,123,842

[45] Nov. 7, 1978

[54] METHOD OF MAKING FREQUENCY SHIELDING MEANS FOR AN ELECTRICAL CONNECTOR

[75] Inventor: Earl A. Cooper, Los Angeles, Calif.

[73] Assignee: Automation Industries, Inc., Los Angeles, Calif.

[21] Appl. No.: 830,818

[22] Filed: Sep. 6, 1977

Related U.S. Application Data

[62] Division of Ser. No. 708,476, Jul. 26, 1976, abandoned.

[51] Int. Cl.[2] .................. H01S 4/00

[52] U.S. Cl. .................. 29/592 R; 29/DIG. 3; 29/DIG. 16; 113/116 P

[58] Field of Search .................. 29/629, 592, DIG. 3, 29/DIG. 16; 113/116 P, 116 V; 339/143 R, 89 M, 258 A, 143 C, 258 R, 96 C, 89 C

[56] References Cited

U.S. PATENT DOCUMENTS

| | | | |
|---|---|---|---|
| 2,146,843 | 2/1939 | Palmer | 113/116 P |
| 2,486,285 | 10/1949 | Hurst | 113/116 P |
| 3,336,566 | 8/1967 | Barker | 339/143 R |
| 3,569,915 | 3/1971 | Sorensen | 339/143 R |

*Primary Examiner*—Victor A. DiPalma

*Attorney, Agent, or Firm*—Anthony W. Karambelas

[57] ABSTRACT

A method of making an annular biased frequency interference shielding member having securement tabs for mounting between plug and receptacle shells of an electrical connector, and having folded resilient fingers having base and distal portions respectively engageable with said plug and receptacle shells under resilient pressure engagement. The folded resilient fingers are precisely dimensioned and formed about an axis such that minimal space intervals are provided between adjacent edges of adjacent resilient fingers whereby virtually 360° shielding integrity is afforded.

9 Claims, 21 Drawing Figures

METHOD OF MAKING FREQUENCY SHIELDING MEANS FOR AN ELECTRICAL CONNECTOR

This is a division of application Ser. No. 708,476 filed July 26, 1976, now abandoned.

BACKGROUND

Electrical connectors are available for coupling a plurality of control circuits which transmit pulses, signals or other forms of electrical frequency patterns which activate and deactivate or cause a change in mode of operation of apparatus or systems to which they are interconnected. In some industrial, military and aerospace operations, it is necessary that such control circuits be protected against interference from stray or jamming radio frequencies which might interrupt or modify the transmitted electrical signal or pulse. Cables of said control circuits are provided with continuous unbroken shielding against such stray frequencies throughout the cable length. At an electrical connector or coupling of cable ends, such shielding must be continued and effective shielding means against such frequencies is desired between the two mating parts of the electrical connector.

Such electrical connectors are subject to repeated coupling and uncoupling of the parts, vibration, shock, and the corresive effect of the particular environment in which the connector is located.

Prior electrical connectors have included various types of construction for completing a grounding path from one electrical connector part to the other part. In U.S. Pat. No. 3,609,632 an annular grounding ring is provided with a band seated on one connector shell, the band being provided with widely spaced resilient curved fingers for engaging the other of said connector shells.

SUMMARY

The present invention relates to an electrical connector having a frequency shielding means extending between the plug and receptacle means of the connector in such manner as to provide a most effective reliable frequency shield means. The invention also relates to the particular construction of such a frequency shield means and a novel method of making the same whereby precise dimensional configurations are obtained in the resulting shielding member whereby the effectiveness of the shielding means is greatly enhanced.

An object of the present invention is to provide an electrical connector having novel radio frequency interference (RFI) shielding means whereby stray radio frequencies are rendered virtually ineffective to modify or change the control circuits coupled by the connector.

An object of the invention is to provide a frequency shield means by forming an annular member having minimal window openings through which frequencies may be transmitted.

A further object of the invention is to disclose a method of making an annular shielding member having a plurality of resilient folded fingers in which openings between adjacent edges of said fingers are minimal in mated relation of the connector.

A further object of the invention is to provide an annular member serving as a frequency shield means which is precisely dimensioned to provide spaces or window openings between edges of the fingers in the order of 0.004 inches.

Still another object of the invention is to provide a resilient annular member having means for securement thereof to one of the connector shells and having resilient finger means constructed in such manner as to provide pressure means for wiping corrosive oxides from the surface of the fingers when the fingers are engaged by a shell.

A still further object of the present invention is to disclose a method of making a frequency interference annular member from a flat rectangular blank of metal stock material in such a manner that the resulting annular shielding member is precisely dimensioned and shaped and presents minimal window openings for transmission of frequencies.

Other objects and advantages of the present invention will be readily apparent from the following description of the drawings in which an exemplary embodiment of the invention is shown. It will be understood that the drawings and detailed description herein disclose subject matter not claimed in this application and which are disclosed and claimed in other applications owned by a common assignee.

IN THE DRAWINGS

Figure 1:
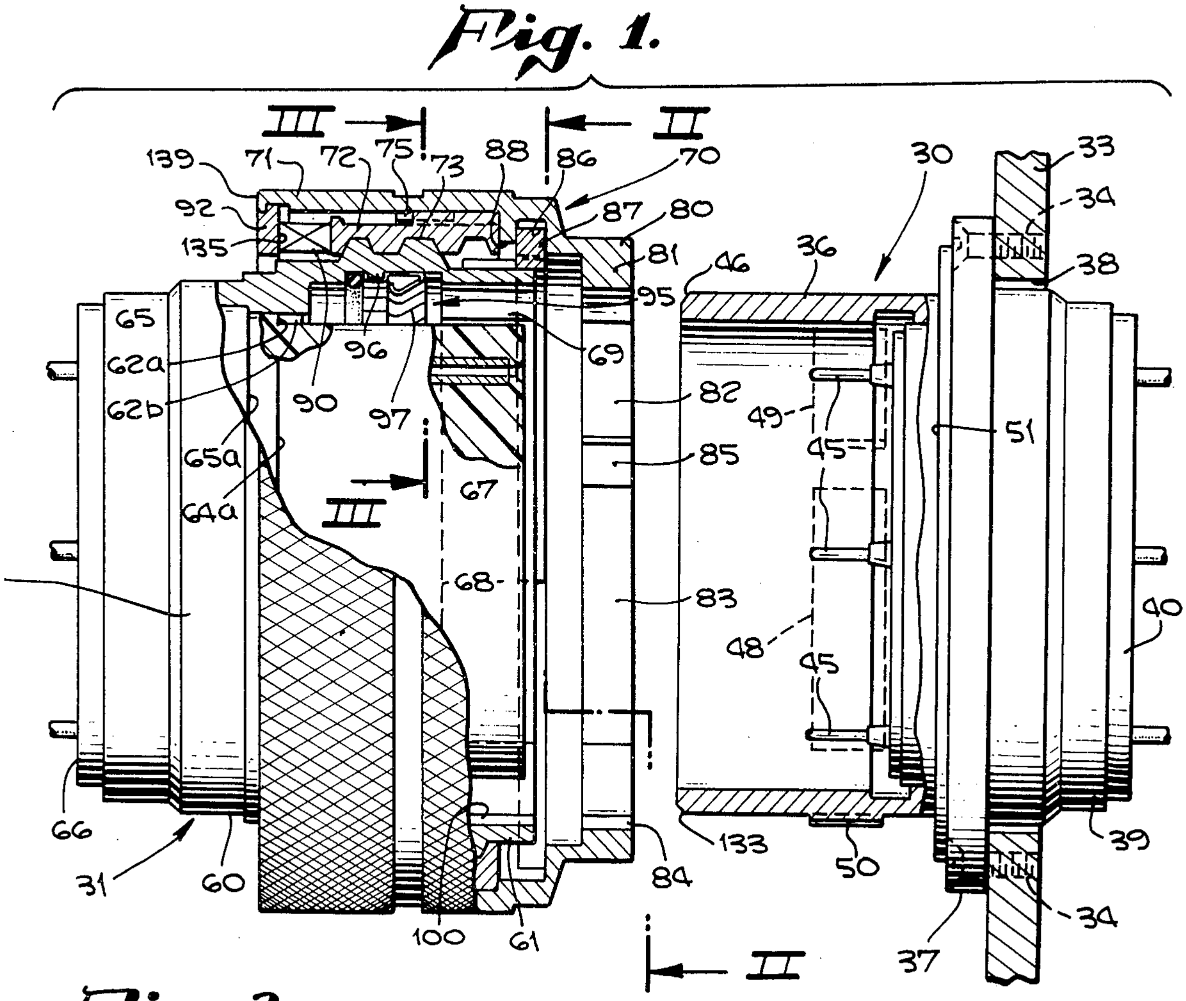
FIG. 1 is an exploded view, partly in section, of a plug means and a receptacle means of an electrical connector embodying this invention.
Figure 2:
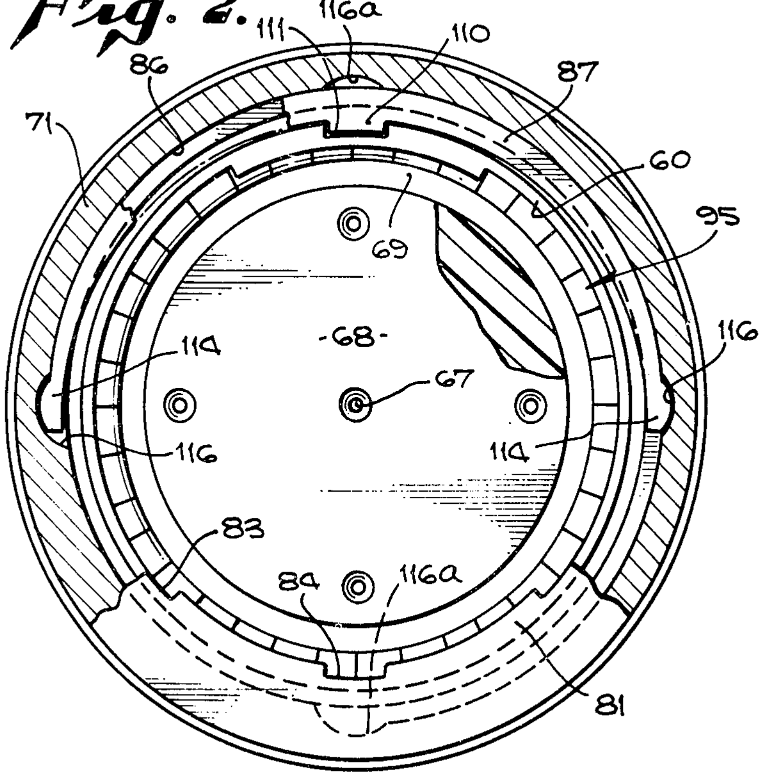
FIG. 2 is a transverse sectional view taken in the planes indicated by line II—II of FIG. 1.
Figure 4:
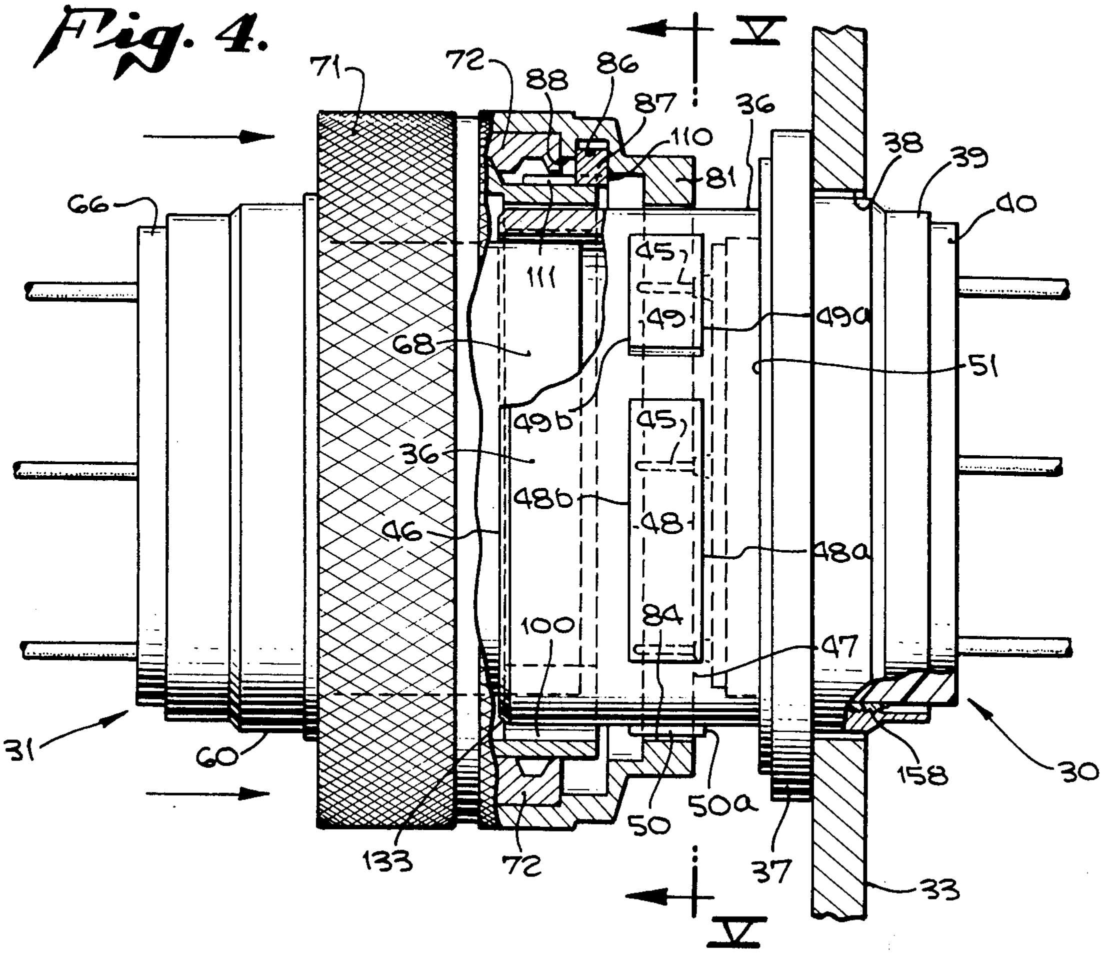
FIG. 4 is an elevational view, partly in section, of the plug means and receptacle means of the electrical connector shown in FIG. 1 in a partially telescoped relation with the pin and socket electrical contacts aligned but in axial spaced relation.

In FIG. 1 is shown a receptacle means 30 coaxially aligned with and separated from a plug means 31, both receptacle and plug means providing an electrical connector generally indicated at 32 (FIG. 4). The electrical connector 32 serves to couple and electrically connect a plurality of cables or wires, the ends of which are secured to the receptacle and plug means at electrical contact elements in known manner. Five cables are shown for coupling by the connector 32, it being understood that the bundle of cables may vary in number and can include as many as 20 cables or more. The plug means 31 is adapted to be advanced along the axis of receptacle means 30 to move the plug means 31 into desired full electrical and mechanical mating of the plug and receptacle means.

Receptacle Means

In this embodiment of the invention, receptacle means 30 includes a receptacle shell 36 comprising a cylindrical wall having a radially outwardly directed annular flange 37 which may be placed against the front face of wall 33 and secured thereto by screw bolts 34. Receptacle shell 36 extends through an opening 38 in wall 33 and may include a back cylindrical shell wall 39 which extends beyond the back face of wall 33.

Figure 19:
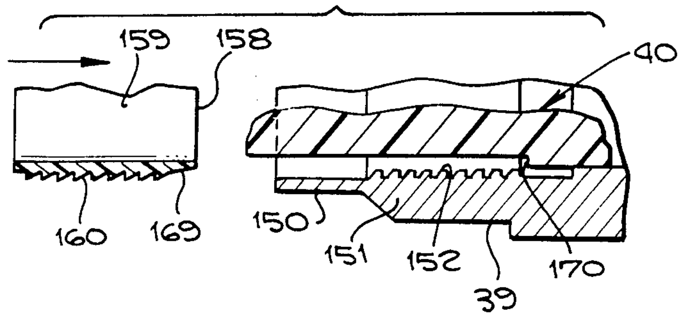
FIG. 19 is an exploded fragmentary sectional view of one of the shells and an insert retainer ring for securing an insert member within said shell.
Figure 20:
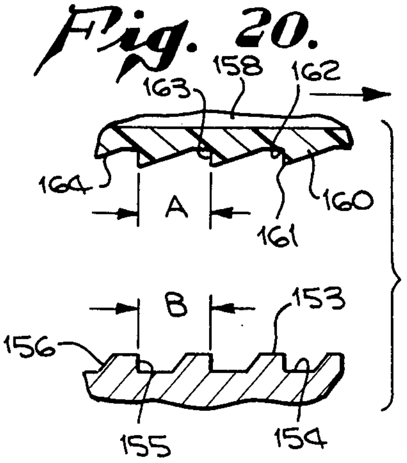
FIG. 20 is an enlarged fragmentary exploded view of the thread configuration on the shell and on the retainer ring in juxtaposition.

Receptacle shell 36 receives and holds a composite insert member 40 of cylindrical form. The external cylindrical surface of insert member 40 may be provided with a plurality of axially spaced radially inwardly stepped shoulders 41, 42 (FIG. 6) for cooperable seating engagement with correspondingly axially spaced and radially inwardly formed shoulders 41*a* and 42*a* on the internal cylindrical surface of shell 36. Insert member 40 is restricted against axial movement in one direction by the abutment of said shoulders. Axial movement of insert member 40 in the opposite direction, that is backwardly of the back shell 39, is restrained by an insert sleeve retainer means in a novel manner as later described in connection with FIGS. 19–21 inclusive.

The front portion of insert member 40 may be made of a resilient dielectric material and the back portion made of a relatively hard dielectric material. Contact pins 45 project from conical bosses 44 of the resilient material, the bosses providing circular sealing contact with hard dielectric material surrounding corresponding socket contacts in the plug means. The axial position of insert member 40 in receptacle shell 36 is such that contact pins 45 carried thereby have their pin ends spaced a predetermined distance inwardly from the edge face 46 of receptacle shell 36. Contact pins 45 are thereby exposed for mating contact with the plug means relatively deeply within the chamber formed by receptacle shell 36 and are protectively enclosed by receptacle shell 36.

Figure 5:
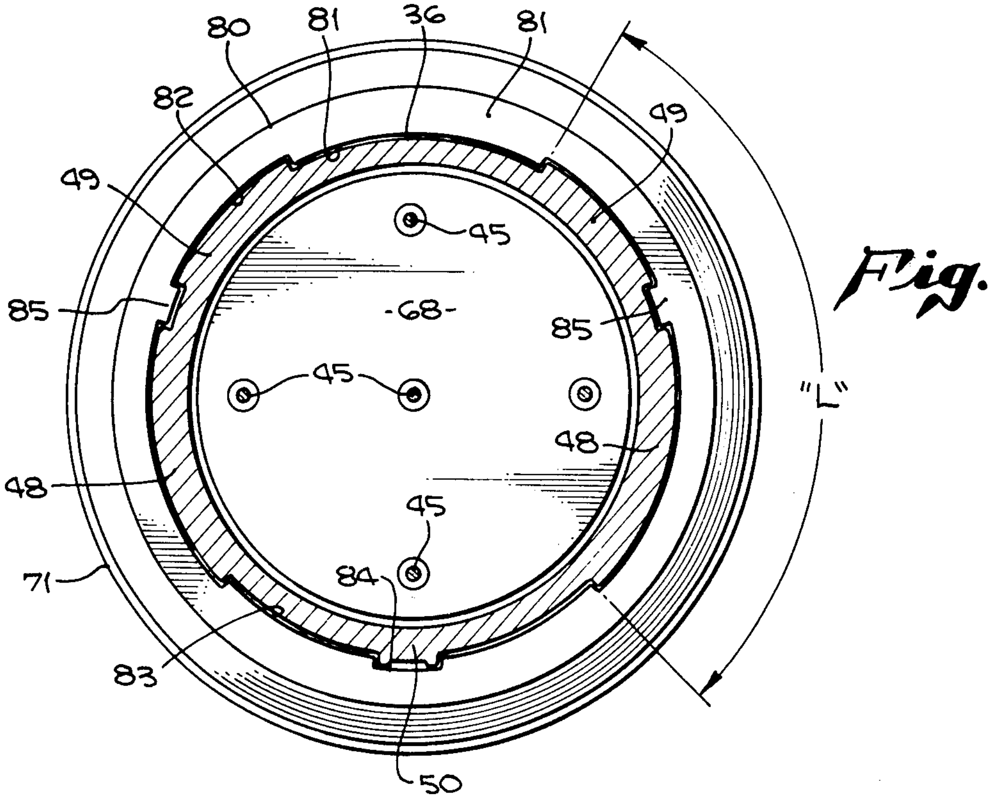
FIG. 5 is a transverse sectional view of FIG. 4 taken in the plane indicated by line V—V of FIG. 4.

Receptacle shell 36 is provided with an external cylindrical surface 47 provided with two sets of circumferentially spaced external radially outwardly directed shell locking lands 48, 49 to provide respective locking faces 49*a*, 48*a* spaced uniformly from the opposed annular face 51 of flange 37. The overall circumferential dimension of "L" (FIG. 5) of each set of lands 48, 49, may remain unchanged for receptacle shells of the same diameter. The arcuate length of each land 48, 49 of each set of lands may be varied to provide a specific different set of lands for receptacles having selected pin contact arrangements or other differing characteristics to avoid mismatching of receptacle and plug means.

A master key 50 is provided on receptacle shell surface 47 between the two sets of locking lands and in the same transverse planar zone as lands 48, 49. Key 50 has a face 50*a* spaced from flange face 51 the same distance as land faces 48*a*, 49*a*. Key 50 may be varied in width or arcuate length to be compatible with a selected plug means and serves to angularly orient the plug and receptacle means.

The interconnection at the insert member between the cables, insert member 40 and contact pins 45 may be made in suitable well-known manner. It is understood that insert member 40 firmly holds the contact pins 45 against relative axial movement and that electrical continuity is preserved through insert member 40 without electrical leakage loss.

Plug Means

Plug means 31 comprises a plug shell 60 having a particularly configured cylindrical wall 61 having an internal diameter slightly greater than the outer diameter of receptacle shell 36 so that shell 36 may be axially and telescopically received therewithin. The plug shell 60 also includes an internal annular flange 62 defining an opening 63 and a shoulder 64 serving to index axially a plug insert member 66 with respect to the plug shell. Flange 62 includes a keyway 62*a* which receives a plastic key 62*b* on insert member 66 to angularly index member 66 also with respect to the plug shell 60. Annular shoulder 65 spaced from shoulder 64 serves as a seat for one end of an insert retainer ring member as later described. A cylindrical plug insert member 66 of suitable hard dielectric material receives ends of cables which are electrically connected within insert member 66 to electrical socket contacts 67 spaced and arranged about the axis of the plug insert member to correspond with the spacing and arrangement of the contact pins 45 on the receptacle insert member 41. The cylindrical portion 68 of plug insert member 66 has an outer diameter which is lightly less than the inner diameter of receptacle shell 36. The outer cylindrical surface of insert member portion 68 defines with the internal cylindrical surface of cylindrical wall 61 of plug shell 60 an annular space 69 for reception of receptacle shell 36 during mating of the plug and receptacle means.

Figure 3:
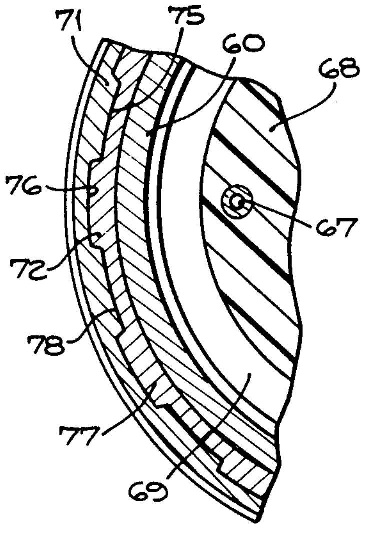
FIG. 3 is a fragmentary sectional view taken in the plane indicated by line III—III of FIG. 1.

Plug means 31 also includes means for coupling or connecting the plug and receptacle means whereby the pin and socket contacts 45 and 67 respectively are properly aligned for electrical mating contact when the receptacle and plug shells 36 and 60 respectively are coaxially drawn together into full electrical mating and mechanical locking engagement. In this example, the coupling means generally indicated at 70 includes a coupling ring housing 71 and a coupling nut 72 within coupling housing 71 and provided with threaded engagement at 73 with external threads provided on cylindrical wall 61 of plug shell 60. Coupling ring housing 71, FIG. 3, is provided on an intermediate portion of its internal surface with a plurality of circumferentially spaced radially inwardly directed lands 75 and grooves 76 for cooperation with complementary lands 77 and grooves 78 on coupling nut 72. Certain of the interengaging lands and grooves may be of different width to angularly orient and position the coupling housing and nut with respect to each other. Coupling ring housing 71, when turned about the axis of the connector, will transmit such turning forces to coupling nut 72 through the interleaved lands and grooves of the coupling housing and nut while permitting relative longitudinal or axial movement between coupling housing and coupling nut.

Coupling housing 71 is provided with a coupling end portion 80 having a radially inwardly directed breech flange 81 provided with circumferentially spaced radially inwardly directed breech lugs 82 and 83 and a keyway 84. The inner diameter of flange 81 with spaced lugs 82 and 83 is slightly greater than the outer diameter of receptacle shell 36 so that the shell 36 may be inserted, after proper orientation of receptacle shell lands and breech lugs, through the breech flange opening for reception between the plug shell and the plug insert member.

Coupling housing 71 also includes between breech flange 81 and an interior radially inwardly directed annular rib 88 a part circular, about 270°, groove 86 to receive a spring detent means 87 of about 180° arcuate shape to audibly and tactilely signal full locked and unlocked condition of the plug and receptacle means as later described.

Coupling housing 71 also encloses an annular spring means 91 which imparts an axially directed spring force against coupling nut 72. One end of nut 72 abuts face 89 of rib 88, the other end of nut 72 providing an annular seating face 90 for one end of spring means 91 which is seated at its opposite end against an annular retaining member 92 breech interlocked with coupling housing 71 as more particularly described hereafter.

The threaded engagement at 73 between plug shell 60 and coupling nut 72 comprises a four lead fast thread adapted to rapidly axially advance plug shell 60 into full mated relationship with receptacle shell 36 upon rotation of coupling ring housing 71. An example of a suitable thread is an Acme stub thread.

Electrical continuity with respect to grounding and radio frequency interference shielding means 95 may be carried within plug shell 60 for engagement with receptacle shell 36, the shielding means 95 being particularly described hereafter. In this example, the RFI shield means 95 is positioned and located on an annular rib 96 provided on the interior surface of plug shell 60 and cooperable with a particular mounting configuration of the shield means to securely position shield means 95. RFI shield means 95 comprises a plurality of resilient fingers 97 which are adapted to be compressed by the forward portion of the receptacle shell 36 to provide electrical contact therewith as hereinafter described in detail.

The construction of receptacle means 30, plug means 31, and coupling means 70 embody novel features of construction and operation which will be further described in detail in connection with a coupling and uncoupling operation of the plug and receptacle means. In this example, receptacle means 30 is fixedly mounted on a wall 33 and is non-rotatable and is non-axially movable. It will be understood that the plug and receptacle means may be moved relative to each other in order to accomplish the coupling and uncoupling functions and that the present example contemplates such an operation.

In FIG. 1, receptacle means 30 and plug means 31 are in spaced relation and positioned along aligned axes of the plug and receptacle means. Plug shell 60 is in retracted axial relation with respect to coupling means 70. Further, in this retracted position, keyway 84 on coupling ring housing 71 is in alignment with an internal keyway 100 on the plug shell. Plug means 31 is then angularly or rotatably aligned by suitable reference marks on the coupling housing and receptacle shell so that the keyway 84 is in linear alignment with master key 50 on the receptacle shell.

If keyway 84 and key 50 are compatible, which determines whether the plug and receptacle means are designed for mating, plug means 31 may than be advanced along the axis of the connector to permit entry of master key 50 into keyway 84 of the coupling housing, FIG. 4. It will be apparent that the ends of contact pins 45 are spaced from socket contact 67 of the plug insert member 66 and that the end portion of receptacle shell 36 has entered the annular space 69 between insert member 66 and cylindrical wall 61 of the plug shell. In such position (FIG. 4) the pin contacts and socket contacts are in alignment, are not in electrical contact, and the plug and receptacle shells are interengaged over a sufficient axial distance to minimize or effectively restrict cocking or axial misalignment of one shell with respect to the other shell. The relative relationship of coupling means 70 with respect to plug shell 60 is unchanged.

Plug means 31, after having been properly aligned and oriented with receptacle means 30 as illustrated in FIG. 4, may be still further advanced axially until the front face of the coupling housing breech flange 81 moves against upstanding annular flange 37 on the receptacle means 30. During this relative axial movement of the plug and receptacle means, the coupling ring housing and associated coupling nut and plug shell are turned only to the extent of matching key 50 with keyway 84 and matching the receptacle shell lands 48 and 49 with the openings provided in the inner circumference of housing flange 81. At the position shown in FIG. 6, the pin contacts 45 are at the openings of the socket contacts on the plug insert member but have not entered the openings.

It should be noted that the breech flange 81 includes keys 85 spaced about 120° from keyway 84, said keys 85 being alignable with and passing through keyways 85*a* formed between locking lands 48 and 49 on receptacle shell 36. The correct orientation of keys 85 and keyways 85*a* permits axial advancement of plug means towards the receptacle means so that the shells can be properly mated. As later described, keys 85 and keyways 85*a* serve to prevent mating of plug means and receptacle means which are not designed or intended to be mated because of different numbers of pin and socket contacts carried by each of the plug and receptacle means.

Advancement of the plug means into full electrical contact of the contact pins and contact sockets is accomplished by turning the coupling ring in one direction through about 90°. Turning of coupling ring housing 71 drives the coupling nut 72 which moves plug shell 60 axially without rotation towards the receptacle means. Plug shell 60 is held against rotation by interlocking of key 50 on the receptacle shell and the keyway 100 on the plug shell, master key 50 having entered keyway 100 upon the last axial movement of the plug means and is disengaged with the keyway 84 on coupling ring housing 71. Thus, in position shown in FIGS. 6 and 10, the coupling ring 71 may be turned relative to the shells; however, plug and receptacle shells are held against relative rotation by the key and keyway 50 and 100. Since the pin and socket contacts have been aligned, the ends of the pins enter the sockets for electrical engagement. Upon completion of turning the coupling housing through 90° (FIG. 10) the breech locking lugs 82 and 83 on the coupling housing are located axially behind the locking lands 48 and 49 on the receptacle shell and the annular flange formed thereon. Relative axial movement of the coupling housing with respect to the plug shell is thereby prevented.

Spring Detent Means

Figure 8:
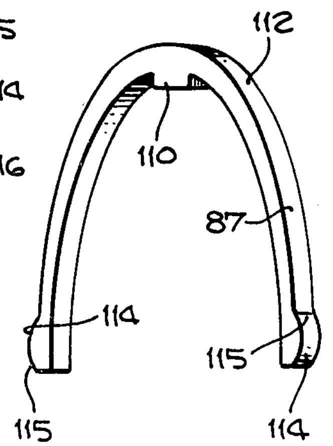
FIG. 8 is a perspective view of a detent spring means of this invention.

Means for audibly and tactilely indicating that the plug and receptacle means are in full mated and locked condition both electrically and mechanically and to hold them in locked condition is provided by the spring detent means 87. Detent means 87 is carried in part-circumferential groove 86 formed in the internal surface of the coupling ring housing 71. As shown in FIG. 8, spring detent means 87 is of arcuate configuration and has an internal key 110 midway between ends of the detent spring means, the key 110 being axially slidably loosely engagable in a keyway 111 provided on the outer surface of the end portion 61 of the plug shell 60. Spring detent means 87 is operable within groove 86 in the coupling ring housing but does not rotate or turn with the coupling housing.

Figure 7:
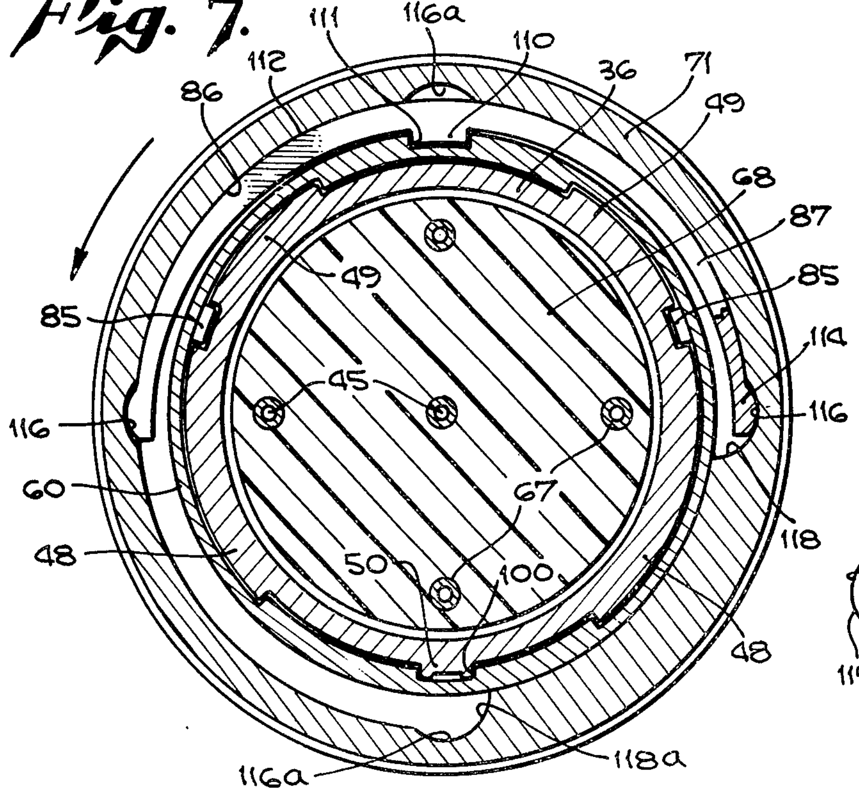
FIG. 7 is a transverse sectional view taken in the plane indicated by line VII—VII of FIG. 6.

Spring detent means 87 includes arcuate arms 112 with radially outwardly extending projections 114 having convex surfaces 115. The arcuate arms 112 are progressively reduced in cross-sectional area towards ends 114. The unrestrained normal configuration of arms 112 provides a space between end portions 114 greater than the distance between a first set of detent recesses 116 provided in diametrical relation in the internal groove 86 provided in coupling housing 71. Detent recesses 116 may be provided with an arcuate internal surface 117 formed about radii generally greater than the radii of convex surface 115 at ends of arms 112. A second set of detent recesses 116*a* is provided in coupling housing 71 and spaced approximately 90° from the first set of detent recesses 116. As best seen in FIG. 7 the annular groove 86 subtends approximately 270° and terminates in the adjacent recesses 116 and 116*a* of the two sets of recesses, the material of coupling housing 71 between recesses providing stops at 118 and 118*a* to limit rotation of the coupling housing by contact of projections 114 therewith.

When detent spring means 87 is assembled within the coupling housing, the arcuate arms 112 are forcibly bent inwardly so that a radially outwardly spring biasing force is exerted against coupling housing 71. When coupling housing 71 is rotated, detent spring means 87 being non-rotatable because of keying to the plug shell, sufficient force must be applied to the coupling housing to cause arcuate arms 112 to radially inwardly compress and projections 114 to disengage recesses 116. As the coupling housing reaches the end of its 90° turn, spring arms 112 snap outwardly as projections 114 are biased into detent recesses 116*a*. When this occurs, a very distinct relatively loud snap or click is heard and felt.

When such an audible and tactile signal is given by rotation of the coupling housing 71, such signal clearly indicates that coupling housing 71 has completed breech locking engagement with receptacle shell 36 and that coupling nut 72 has driven axially forwardly plug shell 30 and insert member therein so that the pin contacts 45 are in full electrical engagement with the contact sockets carried by the plug means.

When the plug and receptacle means are uncoupled, the coupling housing is rotated in the opposite direction, the spring detent arms 112 are radially inwardly compressed upon leaving recesses 116*a*. The coupling housing 71 drives coupling nut 72 in the opposite direction so that the plug shell 60 and its insert body member with socket contacts is axially withdrawn without rotation. The spring detent means 87 again audibly indicates that plug means 31 has become disengaged electrically from the receptacle means 30 by the audible and tactile force of the spring detent means snapping against the coupling housing as the projections 114 enter recesses 116. The coupling housing is then positioned with the keys and keyways on the breech locking flange and shell locking lands aligned so that the plug means can be withdrawn from the receptacle means in an axial direction without rotation.

It should be noted that the coupling nut 72 is biased axially forwardly toward the receptacle means by springs 91. Springs 91 not only facilitate turning of the coupling ring housing 71, which drives coupling nut 72, into full mated and locked relationship desired between the plug and receptacle means, but also after such full mating engagement, the spring means 91 may serve to bias and hold the plug and receptacle means in assembled relation.

Detent spring means 87 may vary in curvature, such curvature is always sufficient to cause forceful snapping of the projections 114 into recesses 116, 116*a* to be heard and felt. Such forceful snapping of detent projections into the detent recesses is facilitated by the loose clearance key 110 has with keyway 111, such loose clearance allowing the detent member to quickly shift position to help produce the loud snapping sound. The loose clearance of key 110 and keyway 111 is correlated to the curvature of the detent projections 114 and recesses 116 so that the detent member does not bind in its contacts with the coupling housing and plug shell and is free to quickly respond as the projections 114 move into the recesses 116. The convex faces 115 and concave recesses 116 116*a* and difference in curvature thereof facilitates the snapping effect and also is one of the factors which tends to maintain assembly because coupling housing 71 cannot be turned until sufficient torque force is applied thereto to release the projections 114 from recesses 116, 116*a*. The amount of force required is predetermined and the arrangement of curved surfaces on projections 114 and recesses 116, 116a may be varied to provide a desired release and snap-in. The construction and bending characteristics of arms 112 may also be varied to obtain a desired force.

RFI Shielding Means

Figure 6:
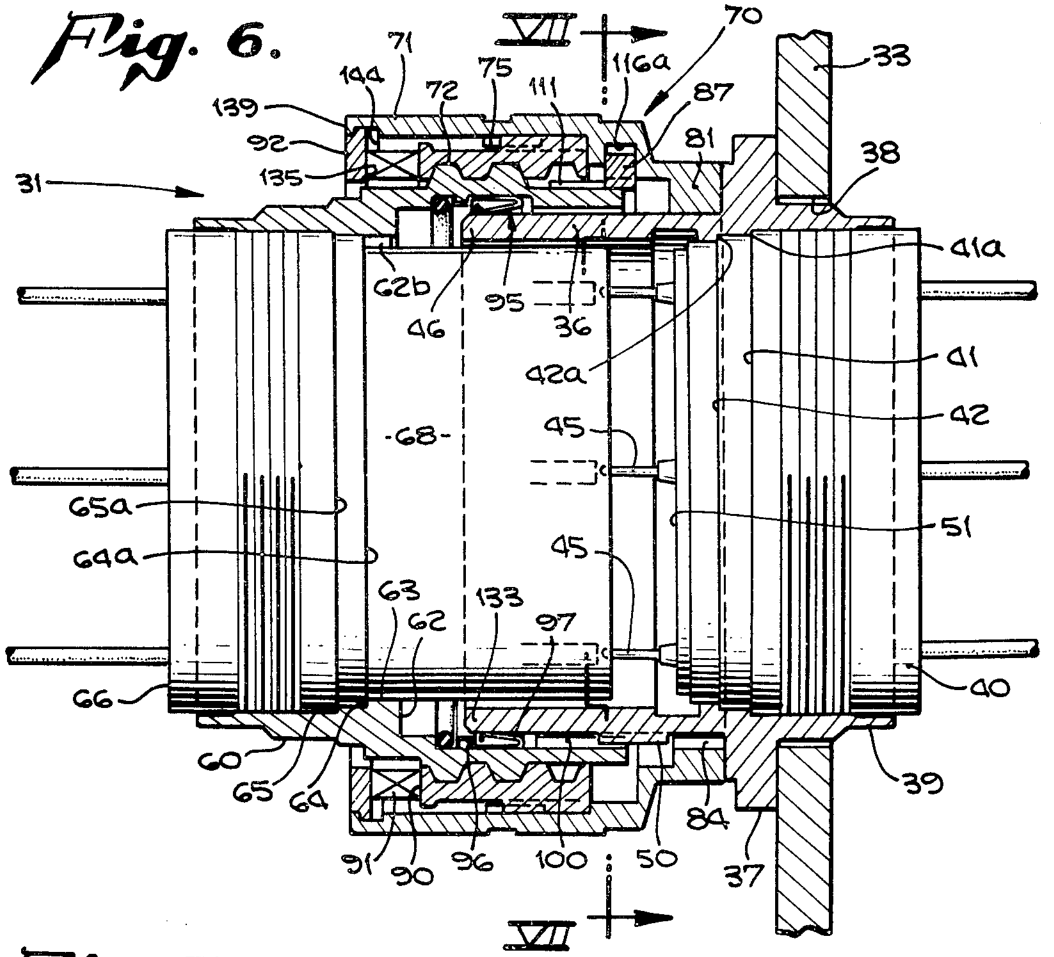
FIG. 6 is an elevational view, partly in section, of the electrical connector shown in FIG. 1 with the plug means and the receptacle means further advanced axially toward each other but with the pin and socket electrical contacts still out of electrical engagement, and with the coupling housing fully advanced axially.
Figure 10:
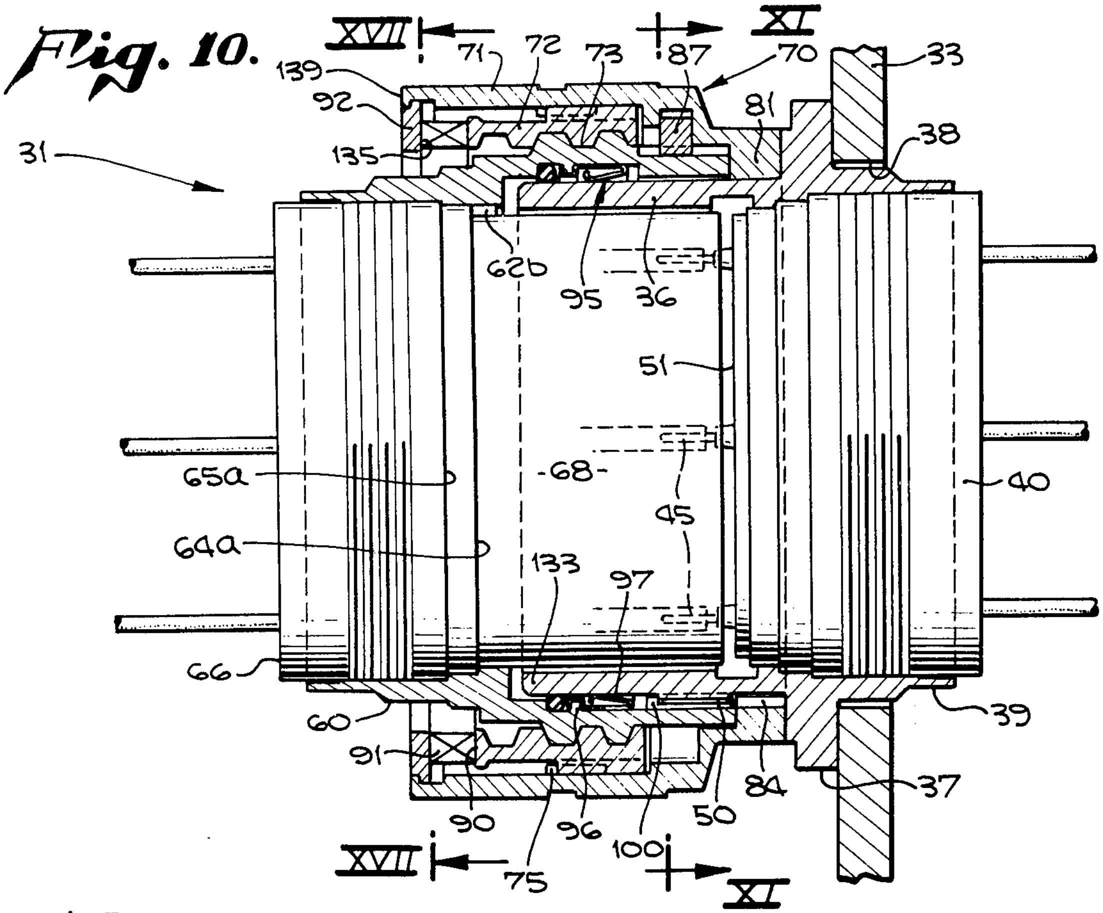
FIG. 10 is an elevational view, partly in section, of the electrical connector shown in FIG. 1 and showing the plug and receptacle means in full electrical and mechanically locked mating relation.
Figure 11:
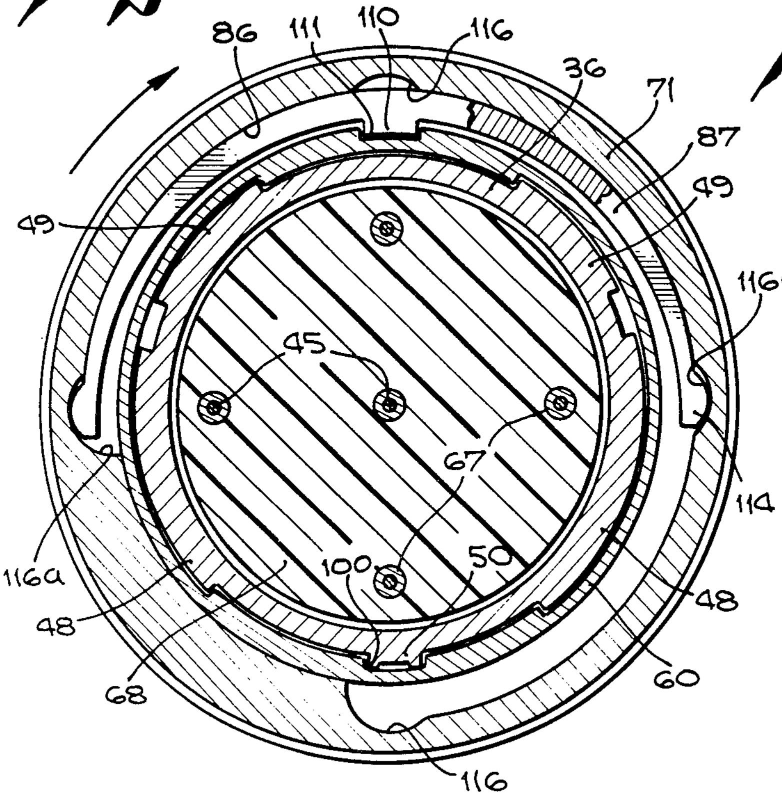
FIG. 11 is a transverse sectional view taken in the plane indicated by line XI—XI of FIG. 10.
Figure 9:
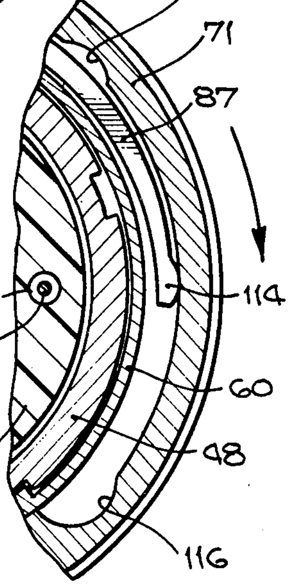
FIG. 9 is a fragmentary sectional view taken in the same plane as FIG. 7 and illustrating position of the detent spring means at an intermediate rotative position of the coupling ring housing.

Means for grounding and shielding electrical connector 32 against frequency interference in the range from 100 MHz to 10 GHz comprises shield means 95 shown in detail in FIGS. 12–16 inclusive. Shielding integrity is provided by a 360° continuous low resistance path from one cable shield to the other cable shield through the electrical connector. In this example, the cable shields are electrically connected to the plug and receptacle shells in well-known manner. The shielding means 95 is in shielding contact relationship with the forward end portion of receptacle shell 36 as shown in FIGS. 6 and 10. As noted in FIG. 6, shielding engagement with receptacle shell 36 occurs prior to electrical contact of contact pins 45 with contact sockets 67.

As previously briefly described, shield means 95 is mounted on an internal annular rib 96 of plug shell 60 and includes a plurality of circularly arranged resilient folded fingers 97 adapted to slidably and electrically contact the external cylindrical surface of receptacle shell 36. Shielding means 95 is so constructed and formed that when installed on the interior of plug shell 60, the spaces or windows between adjacent edges of fingers 97 are minimized and will be in the order of a few thousandths of an inch, for example 0.004 inches.

Figure 14:
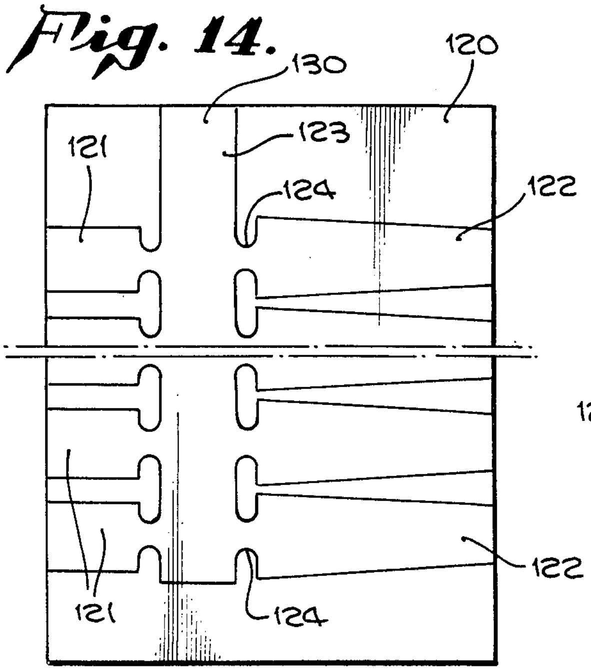
FIG. 14 is a fragmentary plan view of a metal blank from which the RFI means shown in FIGS. 12 and 13 are formed.
Figure 16:
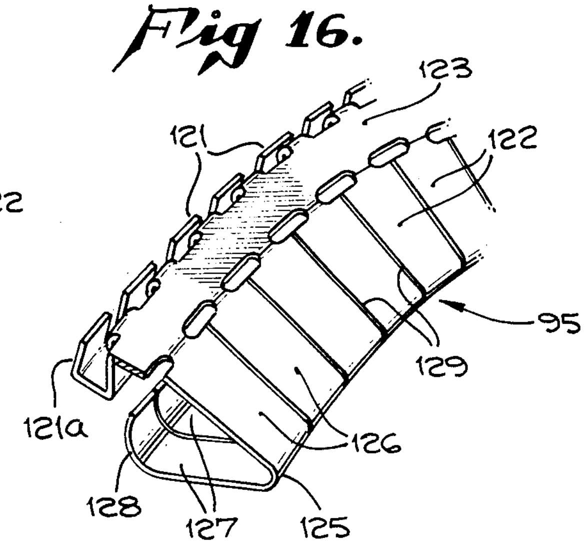
FIG. 16 is a fragmentary perspective view of the RFI means showing the relation of the fingers when the RFI means is formed into an annulus.

In the method of forming such an RFI shield means 95 a rectangular blank 120 of suitable metal stock material such as beryllium copper of about 0.004 inches thick of selected length and width is provided, FIG. 14. On one face of blank 120 is printed or inscribed a preselected pattern of securement tabs 121 and spring fingers 122 extending from an intermediate longitudinally extending band 123. The configuration of fingers 122 is trapezoidal and tapers from band 123 to the end distal therefrom. Securement tabs 121 and fingers 122 are connected to band 123 by narrow neck portions 124. Material of the blank 120 between the inscribed tabs, fingers and band is then chemically etched away so that a precise dimensional configuration of tabs and fingers results.

While the etched blank 120 is in flat form, the material is subjected to a forming operation wherein the securement tabs 121 are bent into generally U-shape as shown in FIG. 15b wherein outer leg 121a of the securement tab is initially formed slightly inclined toward the opposed leg of the tab. The inclination of leg 121a facilitates tight frictional grasping of rib 96 when the shielding means is mounted on plug shell 60.

Fingers 122 are formed as by bending each finger about an intermediate portion which forms an arcuate nose 125 joining a base or first cantilever portion 126 angularly disposed and connected to band 123 and to a second cantilever portion 127 which terminates in an inwardly bent or return end portion 128. As shown in FIG. 15a, in flat form, adjacent edges of fingers 122 continuously diverge from their base portion adjacent band 123 to the return end portion 128.

The etched and formed blank is still in linear form as shown in FIG. 15a. The formed blank may then be turned and shaped about a selected radius into an annulus in which the radially outwardly directed surface of band 123 has a diameter approximately corresponding to the inner diameter of plug shell 60 adjacent to annular rib 96. When the annulus is formed about such radius, the diverging edges of adjacent fingers 122 (FIG. 15a) are drawn into close uniform spaced relation (FIG. 16) at 129. The spaces at 129 are each approximately 0.004 inches. Such extremely close spacing of a plurality of resilient fingers throughout 360° is achieved by the precise correlation of the dimensions of the etched trapezoidal shaped fingers 122 and their relation to the radius of the resulting annulus of the shielding means 95.

The shielding means 95 may be secured as by suitable electrically conductive bonding or soldering to annular rib 96. The annulus may be formed while the securement tabs 121 are being inserted over rib 96. Tab and rib contacting surfaces are preferably made electrically conductive and soldered. Band 123 has an end extension 130 which may overlap the opposite end of the band and be secured thereto in suitable manner as by electrically conductive brazing, soldering or bonding.

Figure 12:
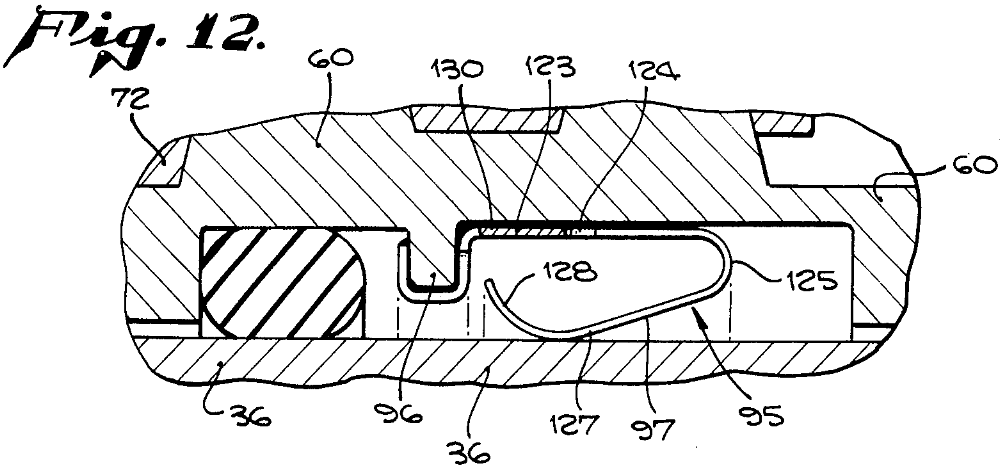
FIG. 12 is an enlarged fragmentary sectional view showing RFI means between the plug shell and receptacle shell of the electrical connector shown in FIG. 1.
Figure 13:
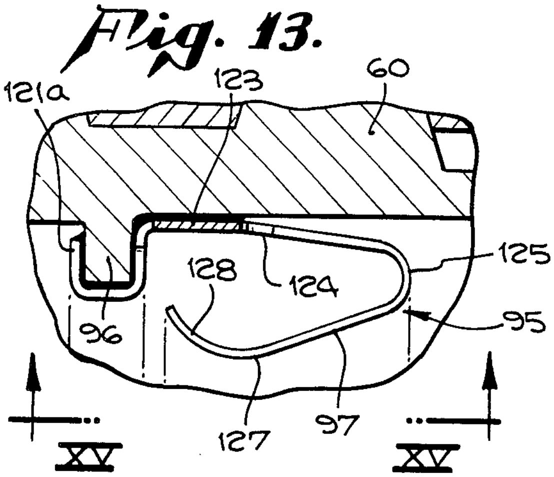
FIG. 13 is an enlarged fragmentary view of the RFI means shown in FIG. 12 out of engagement with the receptacle shell.
Figure 15:
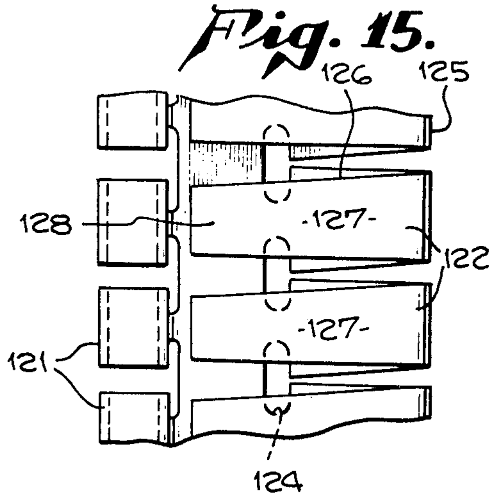
FIG. 15 is a fragmentary plan view of one step in forming the RFI means from the blank shown in FIG. 14.

It will be understood that the resilient fingers 122 may be plated with a nobel metal such as gold, and the surfaces contacted by the fingers on the receptacle shell 36 and plug shell 60 may also be plated or coated with a noble metal such as gold or silver. In FIG. 12, band 123 may be provided with a contact surface at 131 of noble metal. In fully mated position, the plug shell 60 and receptacle shell 36 are provided with a substantially continuous 360° electrically conductive path of low resistance between the metal shells 60 and 36 through the shielding means 95. The precise configuration of the resilient fingers 122 provides minimal window area for transmission of stray frequencies and radio frequency leakage attenuation is maximized.

It should also be noted that the forward edge of the receptacle shell 36 may be chamfered or beveled at 133 so that during relative axial movement of the plug and receptacle means for mating the bevel edge 133 will first contact the radially inwardly biased cantilever portion 127. Surfaces of the shell and fingers will be effectively pressure wiped to remove surface oxidation thereon because of spring biasing forces provided by bending of cantilever portion 127 about nose 125 and by bending of cantilever portion 126 at band 123. Entry of shell 36 into the opening defined by portion 127 of the fingers 122 causes the resilient folded fingers to uniformly move radially outwardly or expand until finger portions 126 are in pressure contact with plug shell 60. The fulcruming of each finger portion 126 about its connection to band 123 enhances the resilient biasing forces available for pressure contact with the shells 36, 60 (FIGS. 6, 10). The precise shape of the fingers in relation to the formed radius of the shielding member permits radially outward flexing of the fingers with virtually little change in the size of the window openings or spaces between fingers. Shielding effectiveness is substantially unchanged. The angular and bent configurations of finger portions 127 and 128 permit relative axial movement of the two shells 36 and 60 without interference. As noted in FIG. 6, contact of shielding means 95 occurs before the pin contacts 45 enter the socket contacts 67 in the plug means.

Coupling Assembly Breech Retaining Means

Figure 17:
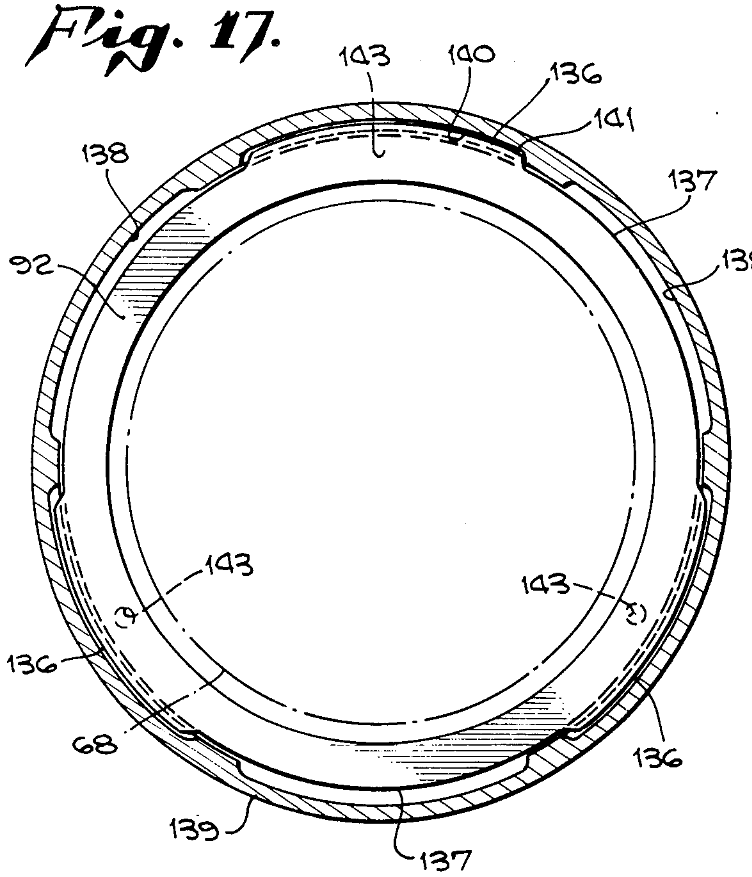
FIG. 17 is a transverse sectional view taken in the plane indicated by line XVII—XVII of FIG. 10 illustrating a lock means for retaining the coupling nut and spring means associated therewith in assembly with the coupling ring housing.
Figure 18:
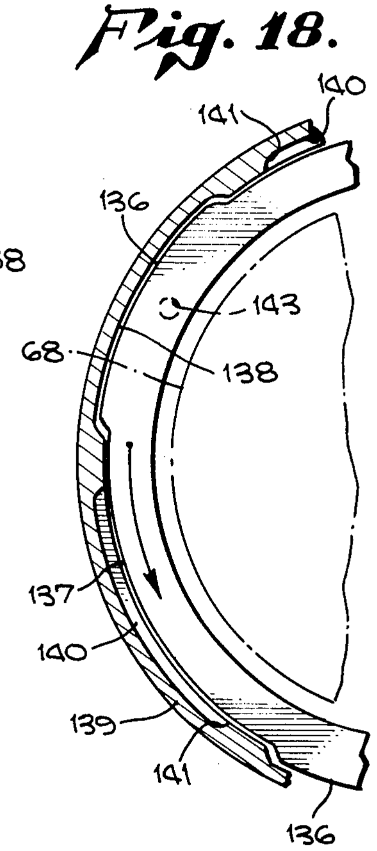
FIG. 18 is a fragmentary sectional view taken in the same plane as FIG. 17 and showing the lock means rotated to an unlocking position.

Coupling ring housing 71 with enclosed coupling nut 72 and springs 91 bearing against one end of the coupling nut are retained in assembly by annular retainer member 92. With particular reference to FIGS. 1, 17 and 18, annular retainer member 92 has an inner diameter approximately the same as the inner diameter of coupling nut 72 and provides an inner annular surface 135 against which one end of springs 91 may seat in assembly. The outer circumference of member 92 is provided with arcuate circumferential breech lands or lugs 136 in spaced relation and defining therebetween openings 137. As shown in FIG. 18, breech lugs 136 may be aligned with internal through openings 138 provided in end portion 139 of coupling ring housing 71. End portion 139, internally of the edge face of the coupling housing is provided with a plurality of circularly spaced recesses 140 having end walls 141, recesses 140 being adapted to receive and to hold therewithin breech lugs 136. Annular retainer member 92 may be provided with three angularly spaced detent indentations or impressions 143 in the outer annular face of member 92.

The coupling assembly breech retainer member 92 may be sleeved over plug shell 60 with breech lugs 136 aligned with the through openings 138 provided in end portion 139 of the coupling housing 71. By using a tool having three prongs corresponding to the spacing of indentations 143, annular member 92 may be pressed uniformly axially toward coupling nut 72 and against the spring forces of springs 91. After retainer member 92 has been axially advanced into contact with the inward shoulder 144 formed by the annular recess 140, the member 92 may be rotated in either direction so as to move the locking breech lugs 136 into the pack space of the recesses 140. Upon release of installing pressure, retainer member 92 is urged axially outwardly by springs 91 to position the breech lugs 136 in recesses 140. In such position it will be apparent from FIG. 17 that turning or rotational movement of member 92 is restricted by the engagement of ends of breech lugs 136 with the end walls 141 of the recesses 140.

Disassembly of the retainer member 92 from the coupling ring housing 71 is accomplished by a reversal of the installation steps described above. The three-pronged tool is again employed to exert an axial pressure on the retainer member 92 to force it axially inwardly against the spring pressure and to then rotate the ring through the necessary angle to align breech lugs 136 with through openings 138 in the end portion of the coupling ring housing. Upon release of pressure from the tool, the retainer member 92 is withdrawn from the end portion of a coupling ring housing. Springs 91 and the coupling ring housing and associated coupling ring nut may then be removed for disassembly.

Insert Retaining Means

Insert members 40 and 66 must be precisely axially positioned and angularly accurately oriented with respect to their respective shells so that proper alignment and mating of the pin and socket contacts may be accomplished. Insert members have been axially located within a shell by seating an insert member against a reference shoulder on the shell to restrain movement in one direction and then by bonding or using a threaded ring or lock washer to restrict movement of the insert member in the opposite direction. Use of such prior devices introduced unwanted tolerances which detracted from such precise positioning. Under some operating conditions, a slightest relative axial movement of the insert member with the shell was objectionable because of its effect upon multiple pin and socket connections and upon securement of the contacts in the insert member. The present electrical connector 32 embodies means for retaining and positively positioning an insert member against a shoulder or other fixed reference without adjustments and without bonding to the shell.

In FIGS. 4 and 19–21 inclusive, an insert retainer means 158 is applied to insert member 40 of receptacle means 30. Back shell 39 of receptacle shell 36 is provided with an outer cylindrical portion 150 of relatively thin cross section. Inwardly from portion 150 the back shell is provided with a relatively thicker cylindrical portion 151 provided on its inner surface with a particularly shaped buttress type thread 152. In this example, threads 152 are formed with a single lead, right hand pitch, and include 50 threads per inch. Cross sectional configuration of threads 152 include a flat crest 153 and a relatively wider flat root 154. Inwardly directed face 155 of the thread is normal to the flat crest and root 153, 154 respectively. Outwardly directed face 156 of the thread is slightly inclined from the root 154 to the crest 153. Spacing between crests 153 of adjacent threads is indicated at B and in this example may be approximately 0.020 inches. The length of the back shell provided with threads 152 may be any suitable length depending upon the axial dimensions of the insert member to be carried by receptacle shell 36. In this example, depth of threads 152; that is, from flat crest 153 to flat root 154, may be approximately 0.005 to 0.006 inches. As noted in the above description, insert member 40 has shoulders 41 seated against reference positioning shoulder 41*a* provided in the receptacle shell.

An insert retaining ring 158 may be made of a suitable compressible thermoplastic material, such as Torlon or Nylon. Ring 158 includes a cylindrical smooth inner surface 159 through which may be received, as by a clearance fit (a few thousandths inches), the back end portion of insert member 40. The outer cylindrical surface of ring 158 is provided with a thread 160 which has two leads, a left hand pitch and includes 25 turns per inch. The thread configuration, also of buttress type, includes a generally triangular cross section having a sharp corner 161 at its crest, a relatively long inclined face 164 leading to a narrow flat root 162 having a width approximately one-third or one-quarter of the space between adjacent crests 161 as identified by the letter A, and an outwardly directed face 163 normal to flat root 162. The crest spacing A in this example may be about 0.020. The outer diameter of the insert retaining ring 158 is slightly larger than the inner diameter of the shell, the sharp corners 161 reaching into the root areas 154 of threads 152.

Figure 21:
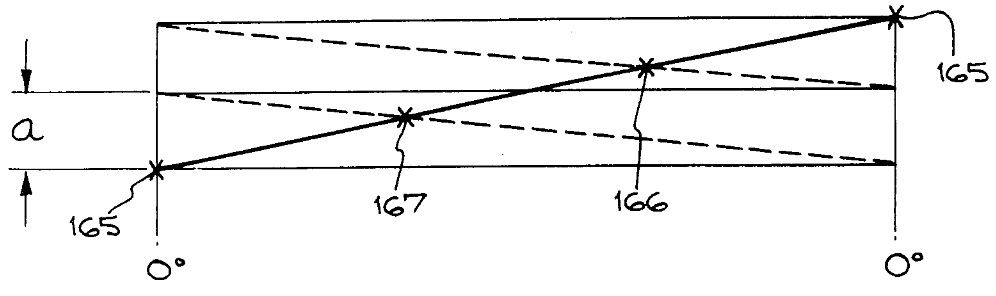
FIG. 21 is a diagrammatic view showing points of interengagement of the threads of the retainer ring with the threads of the shell.

As shown in FIG. 21, the unique configuration of the threads 152 and 160; that is, one being a single lead right hand pitch of 50 threads per inch and the other being a left hand pitch two leads at 25 turns per inch, together with the specific cross sectional configuration of the two threads provides a unique thread interengagement in which mating or meshing thereof will occur at three points spaced approximately 120° apart as indicated in FIG. 21 at 165, 166 and 167. The manner of such interengagement is now described.

In assembly, after the insert member 40 has been angularly oriented and axially positioned against reference shoulder 41*a* within receptacle shell 36, insert retaining ring 158 is sleeved over the end of the insert member 40 and moved axially toward back shell 39. When the sleeve member begins to enter intermediate portion 151 with threads 152, a cylindrical drive tool is employed to forcibly press the insert ring into the receptacle back shell 39 and axially along the shell threads 152. Because the threads are pitched in an opposite direction and are of non-threading, non-mating characteristics, the forcing of the threads of the plastic ring along the threads of the metal back shell 39 places the insert ring under radial compression and causes the threads 160 to successively interengage and forcibly interfit with the threads 152 at three angularly spaced areas indicated in FIG. 21. Such radial pressure interfitting of the threads 152 and 160 during relative axial movement is facilitated by inclined faces 156 and 164. Restraint against opposite relative axial movement is positively restricted by the interabutment of faces 155 and 163 which are normal to the axis of the ring and shell. Such interengagement of compressible thermoplastic threads 160 with metal threads 152 successively and angularly progressively occurs at three angularly spaced places around back shell 39, the thermoplastic retainer ring 158 being deformed under radial compression into somewhat triangularly related locked or interfitting abutment areas 165, 166 and 167 provided by the opposed normal faces 155, 163 of the two different thread configurations.

The tapered configuration of the leading end 169 of ring 158 facilitates entry of the ring end 169 into the shell. The end face of the leading end 169 may be driven against a thrust shoulder 170 on the insert member or against a thrust ring provided on the back portion of an insert member so that the insert member is immovably locked between positioning shoulder 41*a* on the receptacle shell and the insert retainer ring pressed against shoulder 170 and threadably interlocked with the back shell. The compressible retainer ring is linearly pressure driven into engagement with and between the back shell and insert member. The insert retainer ring locks and meshes with the threaded shell to precisely position the insert member in the shell against reference shoulder 41*a* regardless of coarse or loose tolerances between shoulder 41*a* and shoulder 170.

While the example describes the insert retaining member in relation to the receptacle shell, it will be understood that a similar insert retaining ring may be employed at the back portion of plug shell 60 to retain the plug insert member in fixed axial position relative to the plug shell in the same manner as above described.

While a present example of an insert retaining ring has been described with respect to an electrical connector having a cylindrical metal shell and a cylindrical dielectric insert member received within said shell and fixedly holding the insert member in immovable position with respect to the shell, it will be understood that such a compressible insert retaining ring may be employed to restrict to a minimum axial movement between two concentric members utilized in different environment.

It will be understood that when the terms "thread means," "thread configuration" and "threaded interengagement" are used herein, that "threads" include the usual helical type thread shown as well as non-helical annular rings pitched at a desired angle to the axis of the shell and retainer ring. Either or both cooperable threads may be helical or non-helical. The selected pitch of each thread should provide for crossing of the interengaging threads at at least three abutment areas with the insert ring under radial compression.

It will be noted that use of insert retainer ring 158 and such a cooperable back shell 39 provides quick foolproof assembly of the insert member within the receptacle shell and no additional adjustments are required to positively seat and hold insert member 40 against positioning shoulder 41*a*.

Breech Holdoff Means

In some prior electrical connectors relative axial movement of plug and receptacle sections were permitted under desirable conditions which could result in damage to the connector and failure to properly mate electrical contacts. Such undesirable conditions include relative axial movement with a bent contact pin, attempting to mate connector sections in which both sections include protruding contact pins, jamming or cross-starting of the coupling means, and permitting relative axial movement under axial misalignment conditions.

The present construction embodies features which obviates the undesirable conditions mentioned above. It should be noted that breech flange 81 on the coupling housing ring includes two radially inwardly projecting keys 85 located about 120° apart and approximately the same angular distance with respect to keyway 84. Keyway 84, as mentioned above, receives master key 50 on the receptacle shell for orienting the two shells with respect to polarization or axial alignment of mating pin and socket electrical contacts. In the present electrical connector, visible reference indicia are provided on the coupling housing and on the shell in linear alignment with the key 50 and keyway 84 so that the coupling housing, plug shell and receptacle shell are properly angularly oriented for mating of the pin and socket contacts. Before the plug means can be advanced axially with respect to the receptacle shell in such visually aided alignment, it will be apparent that the keys 85 must be oriented with the keyways 85*a* on the receptacle shell to permit further axial movement.

In the event proper visual orientation of master key 50 and keyway 84 is made, but the receptacle shell and plug shell are not compatible for mating as by a difference in number of pin contacts, the orientation of the keys 85 and keyways 85*a* on such noncompatible shells will cause keys 85 to bear against the front faces 48*b* and 49*b* of the locking lands 48, 49 on a noncompatible shell. Such spaced bearing at faces 48*b* and 49*b* provide balanced holding off of the plug means; that is, any axial misalignment of the plug and receptacle means is resisted and minimized so that damage to pin contacts will not occur. Further axial advance of the coupling housing and of a mismatched plug shell and insert member is prevented. As noted in FIG. 4, the tips of the pin contacts 45 are in spaced relation to the socket contacts in the plug insert member. Damage to pin contacts is thereby prevented in the event noncompatible plug and receptacle means are attempted to be coupled together.

It should be noted that the two keys 85 provide such holding off function at two spaced points approximately 120° apart. Cocking or attempting to mate noncompatible plug and receptacle means by manipulation of the plug means in three dimensions is prevented. The use of at least two spaced keys in spaced relation to a master keyway 84 on the coupling housing provides variation in key and keyway patterns so that a wide range of different keying may be made for connectors of the same shell size but with different members of electrical contacts and arrangements thereof.

The electrical connector 32 described above provides many advantages of construction and operation of which some have been particularly emphasized. In the general concept of the electrical connector, it is important to note that the coupling housing ring serves as a single component part which is constructed to perform a number of important functions. First, the coupling ring housing has a breech flange 81 which locks the plug and receptacle means against axial movement by interlocking abutment with the locking lands 48, 49 on the receptacle shell. Such locking lands provide a substantial abutment area so that the loading per square inch is reduced. Second, the coupling ring housing provides in breech flange 81, keys 85 which perform the holdoff function described above to prevent mating of noncompatible plug and receptacle means. Thus, the locking flange 81 provides a key means in which the keys 85 may be varied in spacing so that positive means is provided for preventing attempted coupling of noncompatible plug and receptacle means; and such mating prevention occurs without damage to pin and socket contact members. Third, the coupling ring housing with its locking flange 81 provides a visual and nonchangeable orientation of the plug means with the receptacle means by the alignment of the keyway 84 with the key 50 on a receptacle shell. Thus, positive orientation or polarization of the contact elements of compatible mating plug and receptacle means is assured. Fourth, the coupling ring housing provides an annular part-circular internal channel or groove for housing the detent spring 87, the detent spring being positively oriented with the plug shell and coupling housing through the central key 110 which is movable in an axial direction in the keyway 111 on the plug shell. Fifth, the coupling ring housing provides an annular shoulder 89 for abutment of one end of the coupling nut 72 and also provides the full lock breech recess 140 which secures the annular lock ring 92, which serves as a seat for the springs 91 which bias the coupling nut against the shoulder 89. It will thus be apparent that the specific construction of the coupling ring housing of the electrical connector 32 combines many features which provide an electrical connector which is reliable and in which there are safeguards against damage to connector parts in the event mismatching or attempted coupling of noncompatible connector parts is attempted.

Various changes and modifications may be made in the above described electrical connector and all such changes and modifications coming within the scope of the appended claims are embraced thereby.

I claim:

1. In a method of forming a frequency interference shield means for use in an electrical connector, the steps of:

providing a rectangular blank of conductive metal stock material;

inscribing a selected pattern of securement tabs and fingers on one surface of the metal blank;

chemically etching the material between said tabs and said fingers to provide fingers of precise dimensioned tapered shape;

forming said securement tabs and said fingers into selected cross sectional configurations;

turning said etched and formed blank about an axis to provide an annulus;

and securing ends of said etched blank together with said fingers in close adjacent relation.

2. In a method as stated in claim 1 wherein the step of forming said fingers includes bending proximate and distal portions of said fingers out of the plane of said blank;

folding distal portions of said fingers over said proximate portions of said fingers.

3. In a method of forming a frequency interference shield means for use in an electrical connector, the steps of:

providing a rectangular blank of conductive metal stock material;

providing a selected pattern on said blank of a band extending the length of said blank and spaced fingers extending laterally from one side of the band;

forming each of said fingers into a selected cross-sectional shape;

turning said band and fingers about an axis to provide an annulus wherein said band lies in a cylindrical surface generated by moving a line parallel to and spaced from said axis and said fingers lie in surfaces generated by moving lines inclined to said axis and in opposite directions;

and securing together end portions of said band.

4. In a method as claimed in claim 3 including the step of providing securing elements for said band.

5. A method as claimed in claim 3 wherein the step of turning said band occurs relative to a cylindrical surface on a connector.

6. A method as claimed in claim 3 wherein the step of providing a selected pattern of fingers on said blank includes.

shaping said spaced fingers whereby when said band and fingers are turned at a selected radius about an axis, the spaces between said fingers become minimal.

7. A method as claimed in claim 3 wherein the step of providing a selected pattern on said blank includes, inscribing said pattern on said blank, and chemically etching material from the blank in accordance with said inscribed pattern.

8. A method as claimed in claim 3 wherein the step of providing a selected pattern on said band includes shaping said fingers with a narrow portion adjacent to said band.

9. In a method of forming a frequency interference shield means for use in an electrical connector, the steps of:

providing a rectangular blank of conductive metal stock material;

removing portions of said stock material to define a band and spaced fingers of selected shape;

forming said fingers into a selected cross-sectional configuration in which proximate and distal portions of said fingers relative to said band are bent out of the plane of said blank;

folding distal portions of said fingers over the proximate portions of said fingers;

turning said formed blank about an axis at a selected radius to provide an annulus;

and securing ends of said band with said fingers in minimal spaced adjacent relation.

* * * * *